(12) United States Patent
Robertson et al.

(10) Patent No.: US 6,557,952 B1
(45) Date of Patent: May 6, 2003

(54) REMOTE CONTROL UNIT FOR ELECTRIC WHEEL BRAKE CONTROLLER

(75) Inventors: Charles L. Robertson, Horton, AL (US); William J. Lewandowski, Livonia, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

(21) Appl. No.: 09/994,504

(22) Filed: Nov. 27, 2001

(51) Int. Cl.⁷ .................................................. B60T 7/20
(52) U.S. Cl. ...................... 303/124; 303/20; 303/122.08
(58) Field of Search ...................... 303/7, 9.63, 122.03, 303/122.08, 123, 124, 128, 199, 20

(56) References Cited

U.S. PATENT DOCUMENTS

| | | |
|---|---|---|
| 3,738,710 A | 6/1973 | Pokrinchak et al. |
| 4,122,434 A * | 10/1978 | Jensen .......................... 340/453 |
| 4,398,252 A * | 8/1983 | Frait ............................ 701/70 |
| 4,721,344 A | 1/1988 | Frait et al. |
| 5,050,937 A | 9/1991 | Eccleston |
| 5,149,176 A | 9/1992 | Eccleston |
| 5,242,215 A * | 9/1993 | Krause .......................... 303/7 |
| 5,352,028 A | 10/1994 | Eccleston |
| 5,615,930 A * | 4/1997 | McGrath et al. ................ 303/7 |
| 5,620,236 A * | 4/1997 | McGrath et al. ................ 303/7 |
| 5,741,048 A | 4/1998 | Eccleston |
| 5,782,542 A * | 7/1998 | McGrath et al. ................ 303/7 |
| 6,039,410 A * | 3/2000 | Robertson et al. .............. 303/7 |
| 6,068,352 A | 5/2000 | Kulkarni et al. |
| 6,325,466 B1 * | 12/2001 | Robertson et al. ............ 303/20 |
| 2002/0038974 A1 * | 4/2002 | Lamke et al. .................. 303/7 |

* cited by examiner

Primary Examiner—Christopher P. Schwartz
Assistant Examiner—Devon Kramer
(74) Attorney, Agent, or Firm—MacMillan, Sobanski & Todd, LLC (57) ABSTRACT

A remote manual control is provided for an electronic wheel brake controller. The remote manual control is connected to the wheel brake controller with a cable having quick disconnect connectors at each end. Accordingly, cables having different lengths may be easily substituted for connecting the remote manual control to the wheel brake controller.

13 Claims, 6 Drawing Sheets

REMOTE CONTROL UNIT FOR ELECTRIC WHEEL BRAKE CONTROLLER

BACKGROUND OF THE INVENTION

This invention relates in general to controllers for electric wheel brakes used on trailers and in particular to a remote control unit for such electric wheel brake controllers.

Towed vehicles, such as recreational and utility trailers that are towed by automobiles and small trucks, are commonly provided with electric wheel brakes. The electric wheel brakes generally include a pair of brake shoes which, when actuated, frictionally engage a brake drum. An electromagnet is mounted on one end of a lever to actuate the brake shoes. When an electric current is applied to the electromagnet, the electromagnet is drawn against the rotating brake drum which pivots the lever to actuate the brakes. Typically, the braking force produced by the brake shoes is proportional to the electric current applied to the electromagnet. This electric current can be relatively large. For example, the electric wheel brakes on a two wheeled trailer can draw six amperes of current when actuated and the electric wheel brakes on a four wheeled trailer can draw 12 amperes of current.

Automotive industry standards require that electrically-actuated vehicle wheel brakes be driven against the ground potential of the vehicle power supply. Accordingly, one end of each of the towed vehicle wheel brake electromagnets is electrically connected to the towed vehicle ground and the towed vehicle ground is electrically connected to the towing vehicle ground. The other end of each of the wheel brake electromagnets is electrically connected through an electric wheel brake controller to the towing vehicle power supply.

Various electric brake controllers for towed vehicle electric brakes are known in the art. For example, a variable resistor, such as a rheostat, can be connected between the towing vehicle power supply and the brake electromagnets. Such an actuator is disclosed in U.S. Pat. No. 3,740,691. The towing vehicle operator manually adjusts the variable resistor setting to vary the amount of current supplied to the brake electromagnets and thereby control the amount of braking force developed by the towed vehicle wheel brakes.

It also is known to include an integrating circuit in an electric wheel brake controller. When the towing vehicle brakes are applied, a signal is sent to the integrating circuit. The integrating circuit generates a continually increasing voltage which is applied to the electric wheel brakes. The longer the towing vehicle brakes are applied, the more brake torque is generated by the actuator. A manually adjustable resistor typically controls the rate of integration. On such actuator is disclosed in U.S. Pat. No. 3,738,710.

Also known in the art are more sophisticated electric wheel brake controllers which include electronic circuitry to automatically supply current to the towed vehicle brake electromagnets that is proportional to the towing vehicle deceleration when the towing vehicle brakes are applied. Such electronic wheel brake controllers typically include a sensing unit that automatically generates a brake control signal corresponding to the desired braking effort. For example, the sensing unit can include a pendulum which is displaced from a rest position when the towing vehicle decelerates and an electronic circuit which generates a brake control signal that is proportional to the amount of pendulum displacement. One such unit is disclosed in U.S. Pat. No. 4,721,344. Alternately, the hydraulic pressure in the towing vehicle's braking system or the pressure applied by the vehicle operator's foot to the towing vehicle's brake pedal can be sensed to generate the brake control signal. An example of a controller which senses the towing vehicle brake pressure to generate the brake control signal is disclosed in U.S. Pat. No. 4,398,252.

Known electronic wheel brake controllers also usually include an analog pulse width modulator. The input of the pulse width modulator is electrically connected to the sensing unit and receives the brake control signal therefrom. The pulse width modulator is responsive to the brake control signal to generate an output signal comprising a fixed frequency pulse train. The pulse width modulator varies the duty cycle of the pulse train in direct proportion to the magnitude of the brake control signal. Thus, the duty cycle of the pulse train corresponds to the amount of braking effort desired.

Electronic wheel brake controllers further include an output stage which is electrically connected to the output of the pulse width modulator. The output stage typically has one or more power transistors which are connected between the towing vehicle power supply and the towed vehicle brake electromagnets. The power transistors, which are usually Field Effect Transistors (FET's), function as an electronic switch for supplying electric current to the towed vehicle brakes. The output stage may also include a driver circuit which electrically couples the output of the pulse width modulator to the gates of the FET's.

The output stage is responsive to the pulse width modulator output signal to switch the power transistors between conducting, or "on", and non-conducting, or "off", states. As the output transistors are switched between their on and off states in response to the modulator output signal, the brake current is divided into a series of pulses. The power supplied to the towed vehicle brakes and the resulting level of brake application are directly proportional to the duty cycle of the modulator generated output signal.

It is also known to include an manual override control with electronic wheel brake controllers. Such manual override controls typically include a potentiometer that is actuated by a sliding control lever or pushbutton that is moved by the vehicle driver. The potentiometer provides a manual brake control signal to the input of the analog pulse width modulator. The controllers are usually designed to discriminate between the manual brake control signal and the brake control signal supplied by the sensing unit and to respond to the greater signal.

When connecting a trailer to a towing vehicle, conventional brake controllers require two people to confirm correct connection and operation of the trailer stop lights and brakes. One person actuates the trailer stop lights and brakes from within the towing vehicle while the other person stands behind the trailer to observe operation of the stop lights and brakes. It would be desirable to be able to have one person confirm operation. This is especially desirable for the initial installation of the brake controller so that only one service technician is require to verify correct installation.

SUMMARY OF THE INVENTION

This invention relates to a remote control unit for controllers for trailer electric wheel brakes.

The present invention contemplates a device for controlling an electric wheel brake that includes a first housing that is adapted to be mounted upon a vehicle. The device also includes an electric wheel brake controller circuit mounted within the first housing. The wheel bake controller circuit being adapted to be connected to the controlled electric wheel brake and being responsive to a brake control signal to supply an electric current to the electric wheel brake that is a function of the brake control signal. A first releasable electrical connector is mounted upon the first housing and electrically connected to the wheel brake controller circuit.

The device further includes a second housing that is separate from the first housing. A manual brake control signal generator is mounted within the second housing to form a remote manual control. The manual brake control signal generator is responsive to actuation by a vehicle operator to generate a brake control signal. A second releasable electrical connector is mounted upon the second housing and electrically connected to the manual brake control signal generator.

The device also includes a cable having a releasable electrical connector at each end thereof. The cable connectors cooperating with the first and second electrical connectors mounted upon the first and second housings to electrically connect the manual brake signal generator to the electric wheel brake controller circuit. Accordingly, the cable transmits the manual brake control signal from the manual brake signal generator to the electric wheel brake controller circuit.

In the preferred embodiment, the releasable connectors on the ends of the cable are modular plugs and the first and second electrical connectors mounted upon the first and second housings are modular jacks. Additionally, the invention contemplates providing cables having different lengths that are easily interchangeable. During normal operation, a relatively short cable is used to connect the manual brake signal generator to the brake controller. However, the vehicle operator may substitute a longer cable that would permit him to move to the rear of the towing vehicle while carrying the manual brake control signal generator and test the operation of the towed vehicle brakes.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
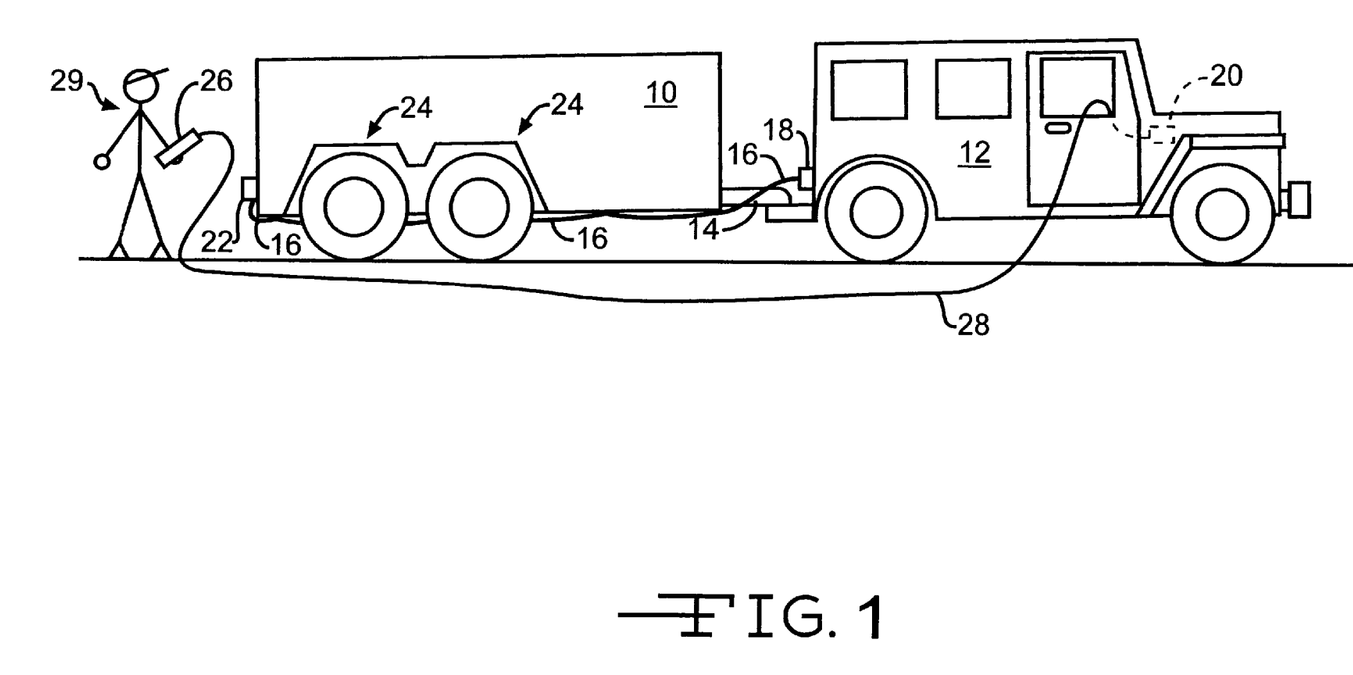
FIG. 1 is a drawing of a towing vehicle and a towed vehicle that illustrates a remote control unit in accordance with the present invention.

Referring now to the drawings, there is illustrated in FIG. 1 a towed vehicle 10 that is connected to a towing vehicle 12 by a conventional trailer hitch 14. An electrical cable 16, containing a plurality of individual wires, for the towed vehicle 10 is connected by an electrical connector 18 to the electrical system of the towing vehicle 12 and to an electronic wheel brake controller 20 that is mounted beneath the dashboard of the towing vehicle 12. The electrical cable 16 provides electricity to the towed vehicle stop and running lights 22 such that the towed vehicle stop lights 22 are illuminated when the brake pedal in towing vehicle is depressed. Additionally, the towed vehicle stop lights flash 22 when the turn signals in the towing vehicle 12 are activated and the towed vehicle running lights are lit when the towing vehicle lights are turned on. The electrical cable 16 also carries electrical current to actuate electric wheel brakes 24 on the towed vehicle 10 that is generated by the electronic wheel brake controller 20 when the towing vehicle decelerates. As described above, the wheel brake controller 20 also includes a manual brake control that can be independently operated by the vehicle driver. When the manual brake control is utilized, the towing and towed vehicle stop lights are illuminated.

As will be explained below, the present invention contemplates adding a hand held remote control unit 26 to the electronic brake controller 20. The remote control unit 26 is connected to the wheel brake controller 20 by a cable 28. In the preferred embodiment, the cable 28 is a length of standard four wire telephone cable. During normal operation, a short connecting cable (not shown) would be used to allow use of the hand held remote control unit 26 within the towing vehicle 12 by either the driver or a passenger. Thus, the driver could hold the remote control unit 26 while operating the towing vehicle 12 and actuate the towed vehicle brakes 24 without taking his eyes off of the road.

Figure 2A:
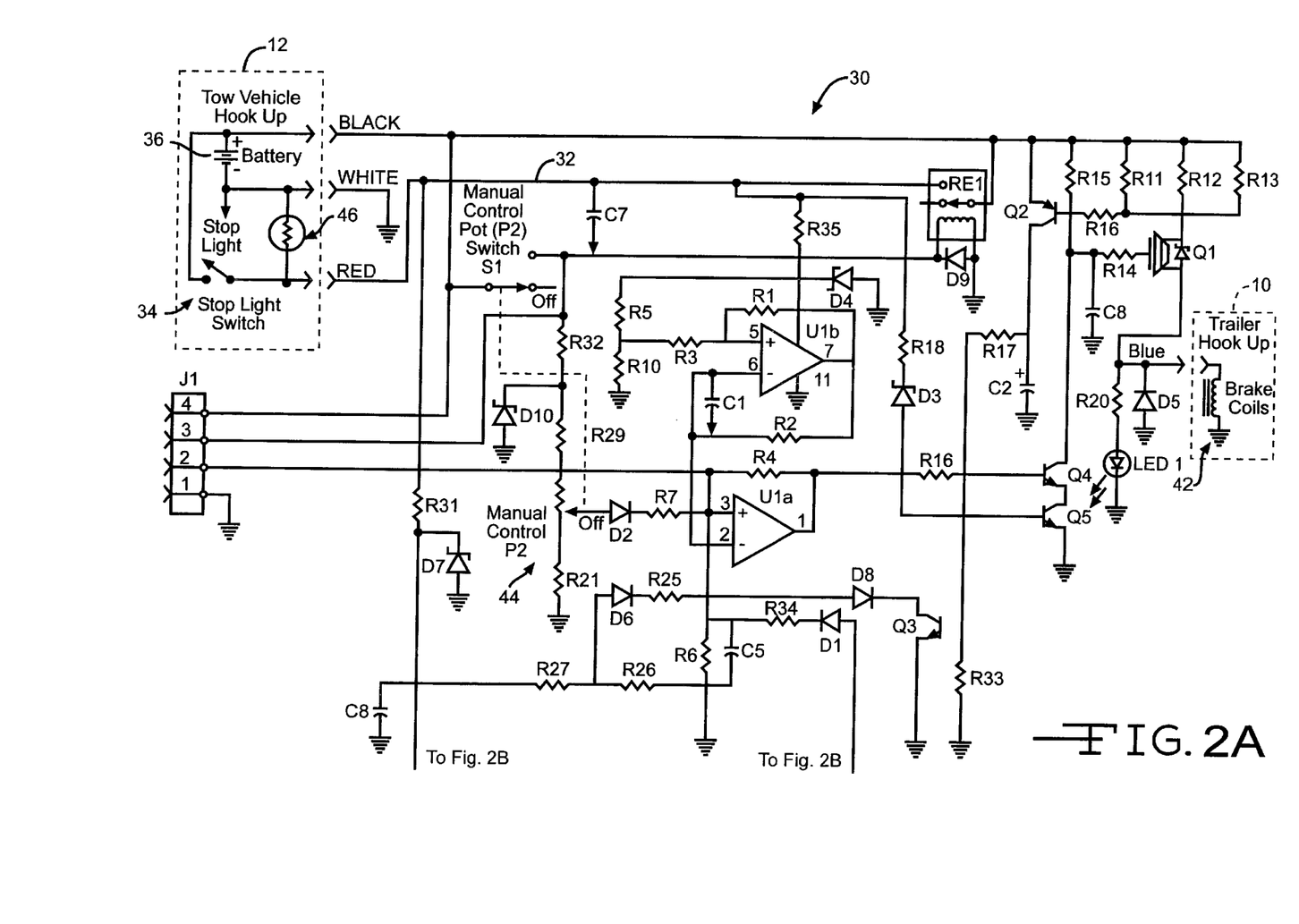
FIG. 2 is a circuit diagram for an electric wheel brake controller that includes the remote control unit shown in FIG. 1.
Figure 2B:
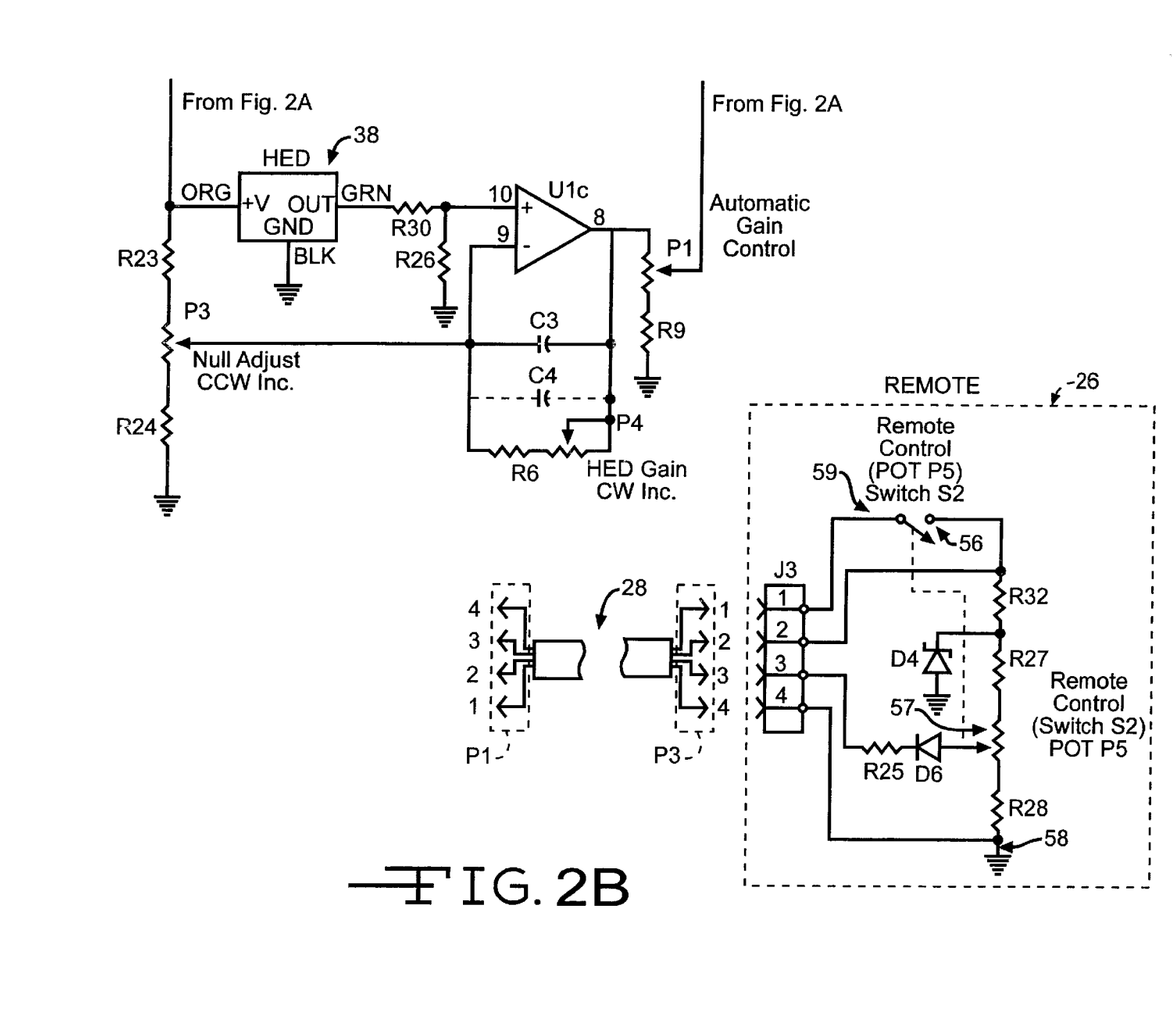

The invention further contemplates that a relatively long length of cable could be substituted for the shorter cable, as illustrated in FIG. 2. In the preferred embodiment, the longer cable would be about 25 to 35 feet long. The longer cable length allows a vehicle operator 29 to connect the remote control unit 26 to the wheel brake controller 20 and then walk to the rear of the towed vehicle 10. Once in position behind the towed vehicle 10 the operator 29 would use the remote control unit 26 to actuate the towed vehicle brakes 24 and confirm their operation of the towed vehicle stop lights 22. Additionally, he could move to towed vehicle wheels and listen for an audible sound that is generated when the towed vehicle brakes 24 are actuated. Thus, the operator 29 could confirm that the towed vehicle brakes 24 are properly connected and operative and also that the towed vehicle stop lights 22 are operative without requiring an assistant to observe the operation.

Referring now to FIG. 2, there is shown a circuit diagram for typical electronic wheel brake controller 30. As indicated in the upper left hand corner of FIG. 2, the controller 30 is electrically connected to the towing vehicle 12, which is graphically indicated by dashed lines. A red supply wire 32 is connected through a towing vehicle stop light switch 34 to a towing vehicle power supply 36. The supply wire 32 provides power to a Hall Effect Device (HED) 38 that is included in a pendulum deceleration sensor (not shown) mounted within the controller 30. Upon the towing vehicle 12 slowing due to a brake application, the HED 38 generates an electrical brake signal that is proportional to the deceleration of the towing vehicle 12. The HED 38 is electrically connected through a first operational amplifier U1c to the positive terminal of a second operational amplifier U1a. Thus, the brake signal generated by the HED 38 is amplified by the first operational amplifier U1c before being applied to the second operational amplifier U1a. For reasons that will become clear below, the brake signal generated by the HED 38 will be referred to as the "automatic brake signal" in the following description.

The second operational amplifier U1a co-operates with a third operational amplifier U1b to generate a pulse width modulated brake control signal at the output of the second operational amplifier U1a. The brake control signal has a variable duty cycle that is proportional to the magnitude of the automatic brake signal. The output 40 of the second operational amplifier U1a is connected to the base of an output transistor Q4 that couples the second operational amplifier U1a to the gate of a power Field Effect Transistor (FET) Q1. The FET Q1 is connected between the towing vehicle power supply 36 and trailer wheel brake coils 42. Thus, the pulse width modulated brake signal generated by the second and third operational amplifiers U1a and U1b switches the FET Q1 between its non-conducting and conducting states with the conducting, or "on", time of the FET Q1 being proportional to the duty cycle of the brake signal pulses. Accordingly, the FET Q1 allows an electric current to flow to the brake coils 42 that has an average value that is proportional to the automatic brake signal magnitude.

The controller 30 also includes a manual brake control that is shown generally at 44 in FIG. 2. The manual brake control 44 includes a potentiometer P2 having an integral normally open switch S1. The normally open switch S1 is connected between the power supply 36 and the coil of a normally open relay RE1. The relay contacts are connected between the power supply 36 and operational amplifiers U1a, U1b and U1c. The relay contacts are also connected between the power supply 36 and the towing vehicle stop light lamps 46, one of which is shown. It will be noted that conventional trailer connections include wiring for the towed vehicle stop light lamps (not shown) so that the towed vehicle stop light lamps and turn signals are illuminated with the towed vehicle stop light lamps and turn signals.

The slider of the potentiometer P2 and the switch S1 are mechanically coupled to a spring loaded manual control lever (not shown) mounted upon the exterior of the housing for the wheel brake controller 30. When the operator first begins to move the manual control lever, the contacts of the switch S1 are closed supplying power to the operational amplifiers and the stop light lamps 46.

The normally open switch S1 also is connected between the power supply 36 and the potentiometer P2. The slider of the potentiometer P2 is connected to the positive input terminal of the second operational amplifier U1a. Thus, upon further movement of the manual control lever, the slider of the potentiometer P2 is displaced and a manual brake control signal is generated by the potentiometer P2. The manual brake control signal is applied to the input of the brake signal generator.

Upon release of the manual side lever, the spring returns the lever to its rest position causing the manual brake signal to be reduced to zero and allowing the contacts of the switch S1 to reopen. Further details of the circuit and its operation are given in co-pending U.S. patent application Ser. No. 09/963,845, filed on Sep. 26, 2001, which is hereby incorporated by reference.

As stated above, the present invention contemplates adding a second manual control 26 to the wheel brake controller 30. The invention contemplates that the second manual control 26 can be remotely located from the wheel brake controller 30. In the preferred embodiment, the remote manual control 26 is connected to the wheel brake controller 30 by a four wire cable 28. In the preferred embodiment, standard four wire telephone cable is used for the connecting cable 28. Such cables are readily available in various lengths. The ends of the cables terminate in releasable electrical connectors. In the preferred embodiment, standard four terminal telephone male connectors, or plugs, P1 and P3 are utilized. Matching standard four wire telephone female connectors, or jacks, J1 and J3 are mounted upon the wheel brake controller 30 and remote control 26, respectively. Such telephone plugs and jacks are readily available and the plugs include a spring finger (not shown) that engages a corresponding slot in the jacks to secure the end of the cable 28 to either the wheel brake controller 30 and the remote manual control 26. By depressing the spring finger on the plug, as is well known, the plug is easily released from the corresponding jack, allowing easy substitution of connecting cables having different lengths.

As shown in FIG. 2, the connector terminals are numbered one through four. For the jack J1 mounted upon the wheel brake controller 30, the first terminal is connected to ground while the second terminal is connected to the brake signal input terminal of the second operational amplifier U1a. The third terminal is connected to the low side of the potentiometer switch S1. Finally, the fourth terminal is connected to the power supply 36.

Figure 3:
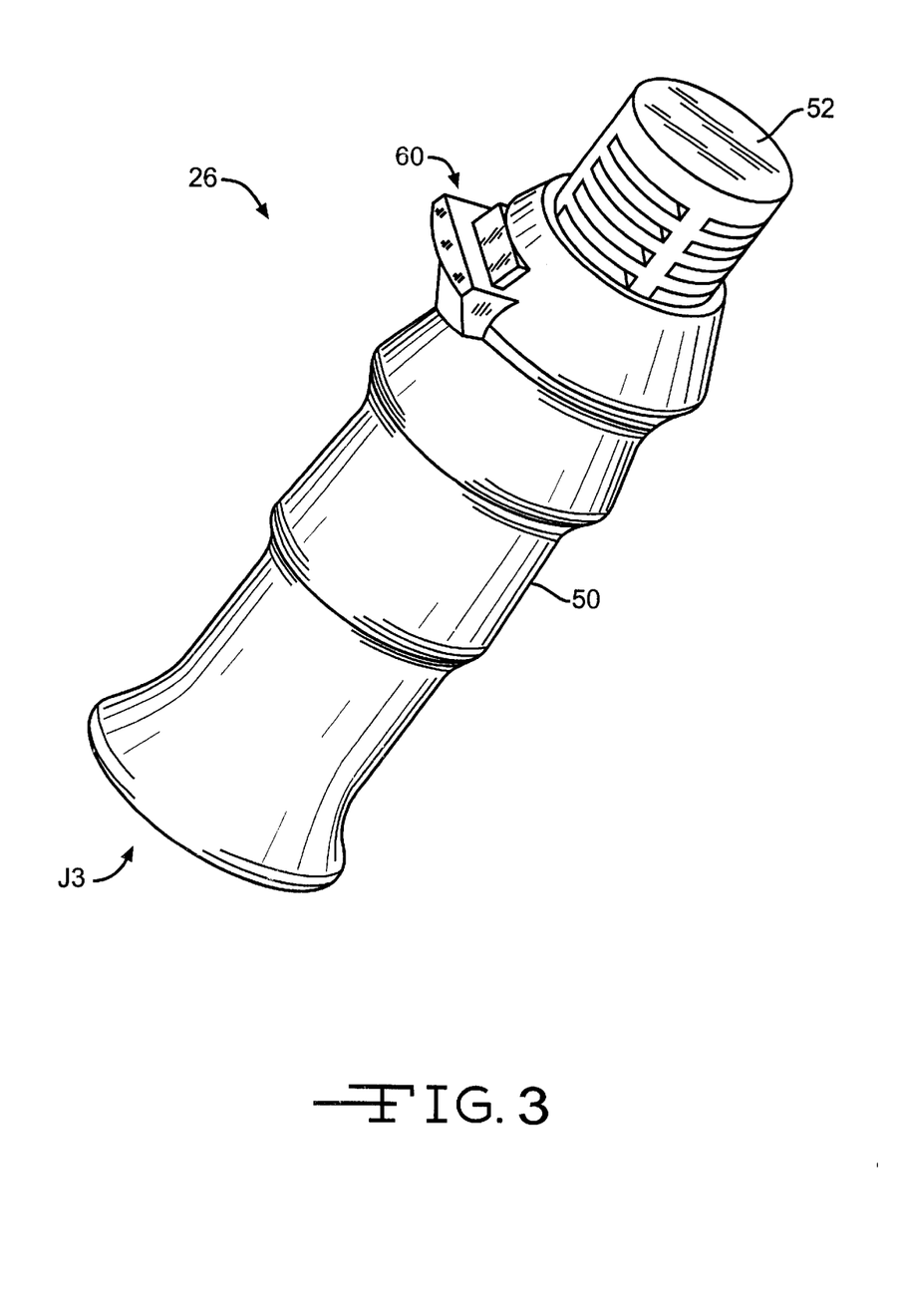
FIG. 3 is a perspective drawing of the remote control unit that is included in FIG. 2.

The invention contemplates that the remote control 26 is a hand held device. In the preferred embodiment, the remote control has a generally cylindrically-shaped housing 50 that can be easily grasped within the vehicle operator's hand, one form of which is illustrated in FIG. 3. The jack J3 is mounted upon the base of the remote control housing 50 (not shown). As also shown in FIG. 3, the remote control 26 includes an axially movable button 52 that extends from the upper end of the housing 50. The button 52 is connected to a spring (not shown) that is mounted within the housing 50 and restores the button 52 to its extended position when released. The button 52 also is connected to second potentiometer P5 that is mounted with the remote control housing 50. The remote control 26 also includes a second normally open switch S2 whose contacts are closed when the button 52 is depressed.

The circuit contained within the remote control 26 will now be described. The first terminal of the jack J3 is connected to a first one of the normally open contacts 54 in the switch S2. The second of the normally open contacts 56 in the switch S2 is connected through a voltage divider comprising first and second series connected resistors R32 and R27 to one end of a fixed resistor 57 in the potentiometer P5. The second switch contact 56 also is connected to the second terminal of the jack J3. The other end of the fixed resistor 57 in the potentiometer P5 is connected through a third resistor R28 to the remote control ground 54. The remote control ground 54 also is connected to the fourth terminal of the jack J3. The cathode of a Zener diode D4 is connected between the junction of the voltage divider resistors 32 and 27. The anode of the Zener diode D4 is connected to ground 54.

The slider of the potentiometer P5 is connected to the anode of a diode D6. The cathode of the diode D6 is connected through a fourth resistor R25 to the third terminal of the jack J3 and from there to the brake signal input pin 3 of the second operational amplifier U1a. Thus, the diode D6 provides isolation between the remote control 26 and the pulse width modulation brake control signal generator circuit. Similarly, a second diode D1 provides isolation between the Hall Effect Device 38 and the brake control signal generator circuit while a third diode D2 provides isolation between the manual brake control 44 and the brake control signal generator circuit. The three diodes D1, D2 and D3 cooperate such that only the brake signal having the highest voltage is applied to the brake control signal generator input pin 3. This accomplished by the diodes preventing the other two lower inputs from pulling down the highest voltage.

The operation of the remote manual control 26 will now be described. Upon depressing the button 52 mounted upon the end of the housing 50, the normally open switch S2 is closed. Because the first and fourth terminals of the jack J3 are connected through the cable 28 to be across the towing vehicle power supply 36, closure of the switch S2 applies the voltage from the towing vehicle across the voltage divider resistors R32 and R27 and the potentiometer fixed resistor 57. The Zener diode D4 regulates the voltage applied to the potentiometer fixed resistor 57 and thus compensates for variation of voltage drops in the connecting cable 28 as different lengths of cable are used. Thus, it is possible to use cables of 25 feet or more without degradation of operation of the controller 30 due to cable voltage drop. Additionally, the Zener diode D4 protects the remote control 50 from voltage surges that can occur in a vehicle electrical system.

The full voltage of the towing vehicle power supply appears at the second terminal 56 of the switch and is fed back through the second connector of the jack J3 and the cable 28 to the low side of the manual control switch S1 in the electronic wheel brake controller 30. Thus, closure of the remote control switch S2 causes power to be applied to the wheel brake controller operational amplifiers U1a, U1b and U1 and, by means of the relay RE1, the stop light lamps 46 are illuminated just as if the controller switch S1 were closed. The energization of the electronic wheel brake controller circuits upon closure of the remote switch S2 provides a "wake up"function to the controller 30.

As the button 52 is further depressed, the remote control potentiometer slider is moved and a remote brake control signal that is proportional to the amount of movement is generated. The remote brake control signal appears at the third terminal of the jack J3 and is transmitted through the connecting cable 28 to the positive input terminal of the second operational amplifier U1a in the brake controller 30. The second and third operational amplifiers U1a and U1b are responsive to the remote brake control signal to generate a pulse width modulated brake signal that is applied through the output transistor Q4 to the gate of the power FET Q1. The power FET Q1 is, in turn, responsive to the brake signal to switch between its non-conducting and conducting states to supply an average current to the towed vehicle wheel brake coils 42 that is proportional to the displacement of the button 52 upon the remote control 26.

As described above, the vehicle operator 29 can use a long connecting cable 28 to allow movement to rear of the towed vehicle 10 where the operator 29 can exercise the towed vehicle brakes 24 while observing operation. The vehicle operator 29 can then substitute a shorter connecting cable (not shown) for use within the towing vehicle 12. In the preferred embodiment, a conventional coiled telephone handset cord is used so that the cable is retracted out of the way. The manual remote control 26 shown in FIG. 3 includes a bracket 60 that cooperates with a corresponding hook (not shown) extending from the brake controller housing for hanging the remote control 26 upon the housing of the wheel brake controller 30 when not in use.

Figure 4A:
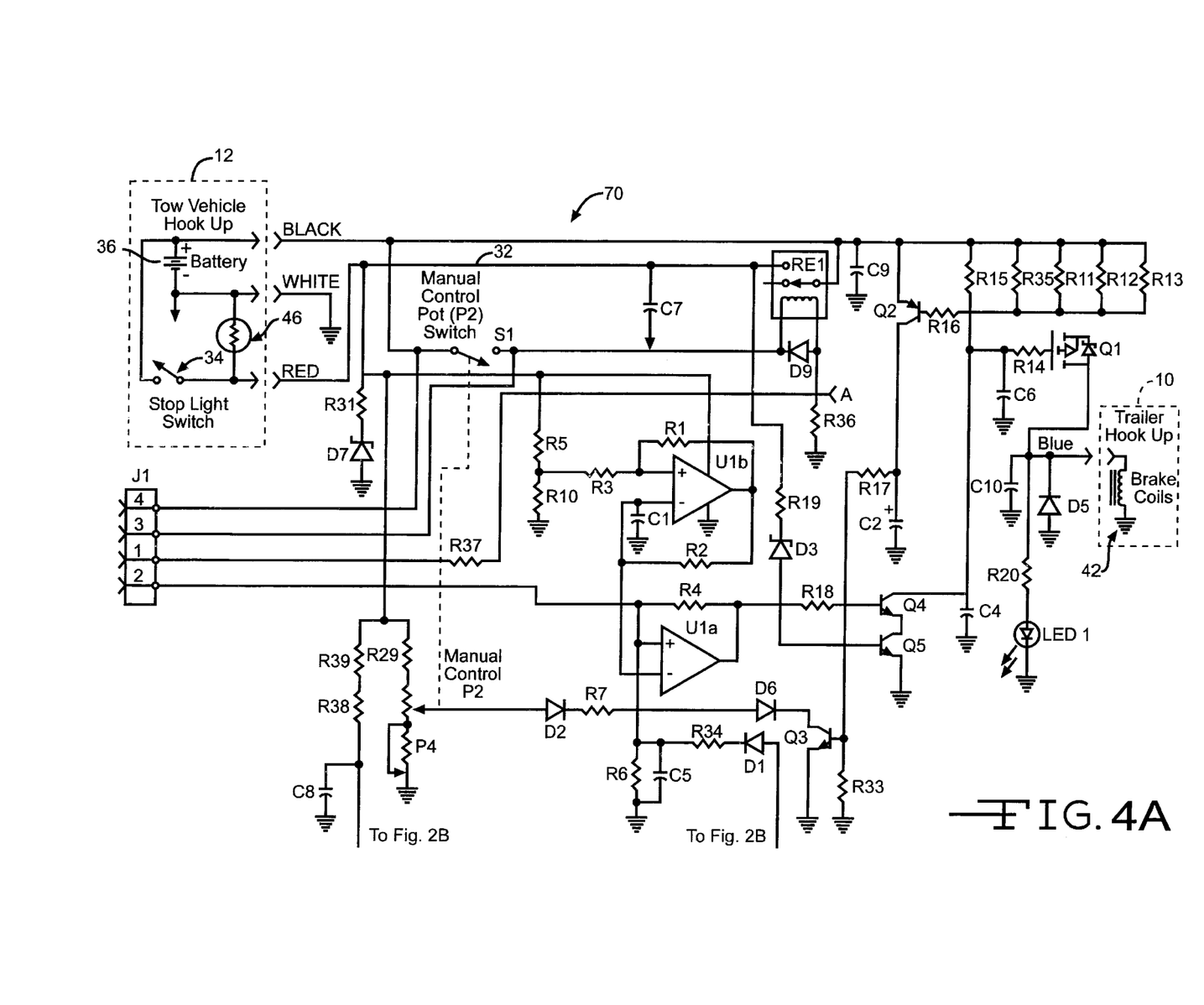
FIG. 4 is a circuit diagram for an alternate embodiment of the electric wheel brake controller shown in FIG. 2.
Figure 4B:
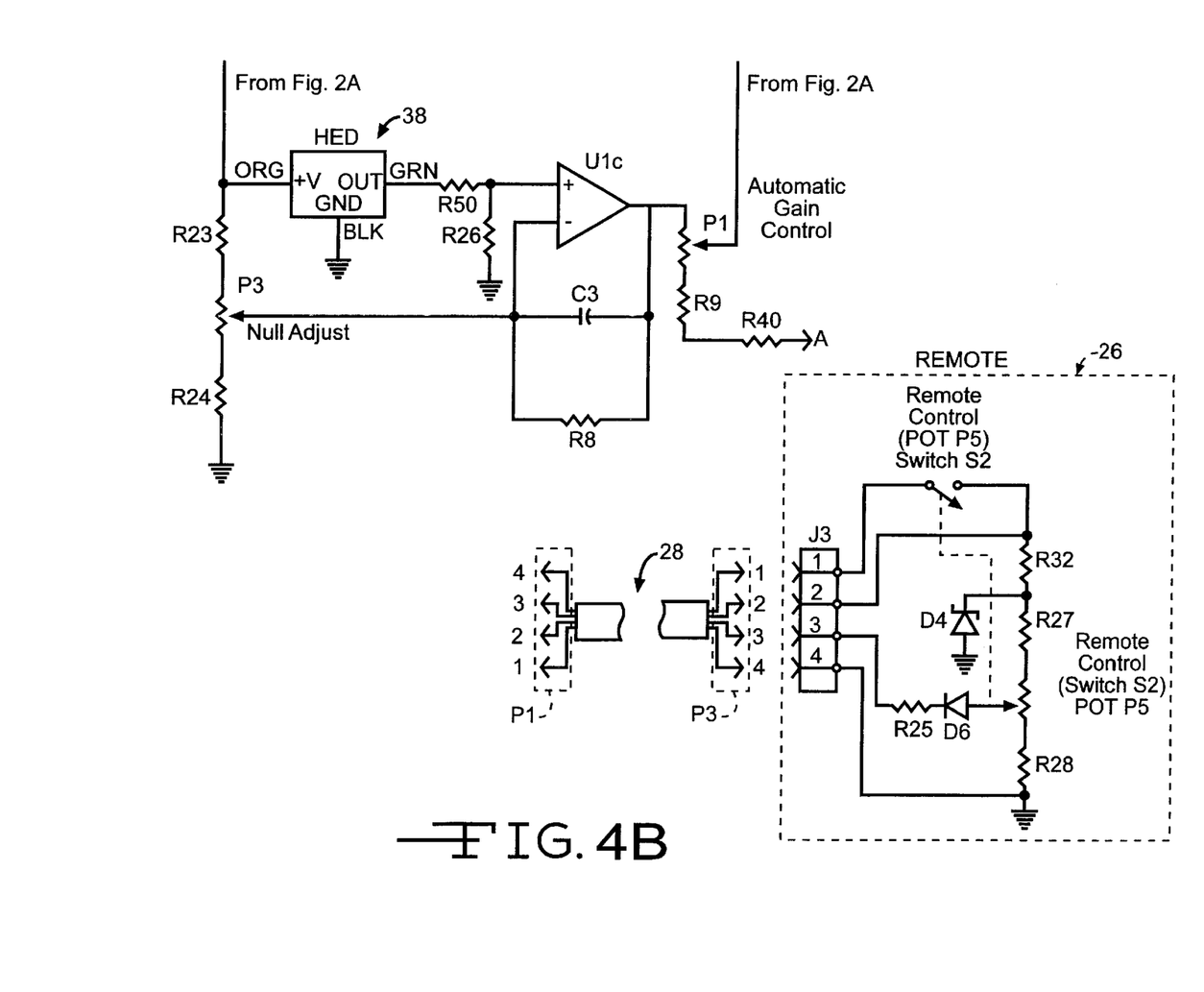

An alternate embodiment of the invention is illustrated in FIG. 4, where components that are similar to components shown in FIG. 2 have the same numerical identifiers. As shown in FIG. 4, the remote manual control 26 is the same as the device shown in FIG. 3; however, the wheel brake controller circuit 70 has less voltage regulating Zener diodes than the circuit shown in FIG. 2. Also, the manual brake control potentiometer P2 that is included in the wheel brake controller 70 is supplied directly from the power supply wire 32 instead of through the switch S1, as shown in FIG. 2. Thus, any voltage drop due to the switch S1 is eliminated. Additionally, the terminal labeled one for the controller jack J1 is connected through a zero ohm resistor R36 to ground. Further details of the circuit 70 are provided in the above reference U.S. patent application Ser. No. 09/963,845.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, while the preferred embodiment of the invention has been illustrated and described with wheel brake controller that includes a manual brake control, it will be appreciated that the invention also may be practiced with a wheel brake controller that does not include a manual brake control.

What is claimed is:

1. A device for controlling an electric wheel brake comprising:

a first housing that is adapted to be mounted upon a vehicle;

an electric wheel brake controller circuit mounted within said first housing, said wheel bake controller circuit adapted to be connected to the controlled electric wheel brake, said brake controller circuit responsive to a brake control signal to supply an electric current to the controlled electric wheel brake that is a function of the brake control signal;

a first releasable electrical connector mounted upon said first housing and electrically connected to said wheel brake controller circuit;

a second housing that is separate from said first housing;

a manual brake control signal generator mounted within said second housing;

said manual brake control signal generator responsive to actuation by a vehicle operator to generate a manual brake control signal;

a second releasable electrical connector mounted upon said second housing and electrically connected to said manual brake control signal generator; and a cable having a releasable electrical connector at each end thereof, said cable electrical connectors cooperating with said first and second electrical connectors mounted upon said first and second housings to electrically connect said manual brake signal generator to said electric wheel brake controller circuit for transmission of said manual brake control signal from said manual brake signal generator to said electric wheel brake controller circuit.

2. The brake control device according to claim 1 wherein said cable is a first cable having a first length and further wherein said brake control device includes a second cable having a second length that is different from said first length, said second cable also having a releasable electrical connector at each end such that said second cable can be substituted for said first cable.

3. The brake control device according to claim 1 wherein said releasable connectors on the ends of said cable are modular plugs and said first and second electrical connectors mounted upon said first and second housings are modular jacks.

4. The brake control device according to claim 3 wherein said manual brake control signal generator includes a moveable device connected to said brake signal generator whereby movement of said device causes said brake signal generator to produce a brake signal that is a function of the movement of said movable device.

5. The brake control device according to claim 4 wherein said manual brake signal generator includes a potentiometer coupled to said movable device, said potentiometer having a fixed resistor portion and a slider resistor contact and further wherein said cable includes at least three wires with two of said wires connecting said fixed potentiometer resistor to a voltage supply and ground of said wheel brake controller circuit and said third wire connecting said potentiometer slider contact to a brake signal input terminal of said wheel brake controller circuit whereby said movable device causes a voltage to appear at said brake signal input terminal of said wheel brake controller circuit that is a function of the amount of movement of said movable device.

6. The brake control device according to claim 5 wherein said manual brake signal generator also includes a normally open switch that has a pair of switch contacts, said switch being coupled to said moveable device such that the initial movement of said moveable device closes said switch contacts and further wherein said cable includes a fourth wire that connects one of said switch contacts to said wheel brake controller circuit while the other of said switch contacts is connected through another one of said cable wires to the power supply of said wheel brake controller circuit, whereby movement of said moveable device closes said switch contacts and thereby causes power to be supplied to said brake controller.

7. The brake control device according to claim 6 wherein said manual brake signal generator also includes a voltage regulation device connected across said potentiometer fixed resistor, whereby the voltage appearing across said potentiometer is maintained at a generally constant level.

8. The brake control device according to claim 7 wherein said voltage regulation device includes a Zener diode having an anode connected to ground and a cathode connected to the junction of said potentiometer fixed resistor and said power supply.

9. The brake control device according to claim 8 wherein said second housing has a generally cylindrical shape to allow said housing to be gripped with an operator's hand and further wherein said movable device consists of a button mounted in an end of said second housing and axially movable into said housing when depressed.

10. The brake control device according to claim 9 further including a spring device mounted within said second housing to urge said button back to a rest position when released whereby the output of said manual brake signal generator is reduced to zero and said switch contacts are opened.

11. The brake control device according to claim 10 wherein said cable is a first cable having a first length and further wherein said brake control device includes a second cable having second length that is different from said first length, said second cable also having a releasable electrical connector at each end such that said second cable can be substituted for said first cable.

12. The brake control device according to claim 11 wherein said cable electrical connectors are standard telephone plugs and said housing electrical connectors are standard telephone jacks.

13. The brake control device according to claim 12 wherein said cable is standard telephone cable.

* * * * *